United States Patent [19]

Okada

[11] Patent Number: 5,569,109
[45] Date of Patent: Oct. 29, 1996

[54] GEARED STEERING DEVICE FOR CRAWLER VEHICLE AND CONTROL SYSTEM THEREFOR

[75] Inventor: Toshikazu Okada, Hirakata, Japan

[73] Assignee: Kabushiki Kaisha Komatsu Seisakusho, Tokyo, Japan

[21] Appl. No.: 266,019

[22] Filed: Jun. 27, 1994

Related U.S. Application Data

[63] Continuation-in-part of Ser. No. 188,440, Jan. 28, 1994.

[30] Foreign Application Priority Data

| Jan. 28, 1993 | [JP] | Japan | 5-006096 |
| Jun. 25, 1993 | [JP] | Japan | 5-180828 |

[51] Int. Cl.$^6$ ............ B62D 11/06; B62D 11/02; B62D 6/00
[52] U.S. Cl. .............. 475/28; 475/31; 477/1; 180/6.2
[58] Field of Search .............. 475/18, 28, 29, 475/30, 27, 31, 72; 477/1; 180/6.2, 6.7, 9.44; 74/732.1

[56] References Cited

U.S. PATENT DOCUMENTS

| 3,405,574 | 10/1968 | Livezey | 475/28 X |
| 4,327,603 | 5/1982 | Zaunberger et al. | 475/28 X |
| 4,434,680 | 3/1984 | Riediger et al. | 475/23 |
| 5,325,933 | 7/1994 | Matsushita | 180/6.7 |

FOREIGN PATENT DOCUMENTS

| 2685264 | 6/1993 | France | 477/1 |
| 55101139 | 12/1980 | Japan | |
| 1-501054 | 4/1989 | Japan | |
| 1527072 | 12/1989 | U.S.S.R. | 180/6.7 |
| 1772031 | 10/1992 | U.S.S.R. | 180/6.7 |
| 8001597 | 8/1980 | WIPO | |
| 8802715 | 4/1988 | WIPO | |

Primary Examiner—Khoi Q. Ta
Attorney, Agent, or Firm—Richards, Medlock & Andrews

[57] ABSTRACT

A geared steering system, which is capable of actuating rightside and leftside driving mechanisms to ensure efficient operation of a crawler vehicle, has a geared steering device (30) and a control system. The geared steering device (30) has one power input shaft (31), leftside and rightside steering brakes (38L, 38R) and leftside and rightside direct-coupled clutches (36, 44), one turn clutch (46), three planet gear trains (40, 43, 48), leftside and rightside power output shafts (32L, 32R) coupled to leftside and rightside steering brake hubs (34L, 34R), and a hydraulic turning motor (83) coupled to the turn clutch (46) with gears. The control system has a controller (56) which compares an actual steering ratio of the geared steering device (30) and a designated steering ratio, and outputs a correction signal for approximating the actual steering ratio to the designated steering ratio to solenoid valves (60–64) for controlling the leftside and rightside direct-coupled clutches (36, 44), the turn clutch (46) or the leftside and rightside steering brakes (38L, 38R), an engaging signal to a direct-coupled clutch for an opposite direction to the steering direction to be entered by an operation lever (57), and, in a low speed large radius turn, a signal for controlling an amount of discharge of a variable capacity hydraulic pump (87).

19 Claims, 8 Drawing Sheets

GEARED STEERING DEVICE FOR CRAWLER VEHICLE AND CONTROL SYSTEM THEREFOR

RELATED APPLICATION

This is a continuation-in-part of U.S. patent application Ser. No. 08/188,440, filed Jan. 28, 1994 by Toshikazu OKADA, Hiroshi ITOGAWA, and Hidekazu NAGASE.

FIELD OF THE INVENTION

The present invention relates to a steering system for a crawler vehicle, and, more particularly, to a geared steering device which selectively actuates a rightside driving device and a leftside driving device of the crawler vehicle for efficiently steering the crawler vehicle. The invention also relates to a control system for such driving devices.

BACKGROUND OF THE INVENTION

A geared steering device for a crawler vehicle has been proposed, for example, in the Published Japanese Translations of PCT Patent Applications from Other Countries No. 501139-1980. As shown in FIG. 5, a vehicle 1, having a geared steering device mounted thereon, has a travel drive comprising a leftside track shoe 2 and a rightside track shoe 3. Each of these track shoes 2, 3 is driven by a respective one of the left drive sprocket 6L and the right drive sprocket 6R. These drive sprockets 6L, 6R are connected to a prime mover driving device 7, such as an internal combustion engine. Specifically, as shown in FIG. 6, a driving power of the driving device 7 is transmitted to each drive sprocket 6L and 6R through an input shaft 9 and respective ones of geared steering device components 8L, 8R, output shafts 10L, 10R, and final reduction gears 4R, 4L.

The operations of conventional geared steering device components 8R, 8L in a high speed mode, a low speed mode, and a braking mode will be described with reference to FIG. 10, which is a skeletonized illustration of a conventional geared steering device.

In the high speed mode, the right brake 11R, the left brake 11L, the right low speed clutch 12R, and the left low speed clutch 12L are released. The right rotatable housing 14R is coupled to right drive hub 15R by engaging the right high speed clutch 13R. Similarly, the left rotatable housing 14L is coupled to the left drive hub 15L by engaging the left high speed clutch 13L. The left brake hub 22L is directly connected to left output shaft 10L, while the right brake hub 22R is directly connected to the right output shaft 10R. Accordingly, the input shaft 9 is directly gear-engaged with rotatable housings 14R, 14L, and the output shafts 10R, 10L. Therefore, the driving force of the prime mover 7 directly drives the output shafts 10R, 10L by means of the bevel gears 23, 24 and the input shaft 9 so that the rotation of the input shaft 9 is transmitted to the output shafts 10R, 10L at the speed ratio of 1 to 1.

In the low speed mode, although the high speed clutches 13R, 13L and the brakes 11R, 11L are released, each hub 16R, 16L is secured to the respective fixed housing 17R, 17L by the engagement of the low speed clutches 12R, 12L, thereby fixing the sun gears 18R, 18L. Therefore, the planet gears 19R, 19L move around the respective sun gear 18R, 18L when the planet gears 19R, 19L are driven by the ring gears 20R, 20L, which are attached to the rotatable input housings 14R, 14L. As it is common to utilize a plurality of planet gears rotatably mounted on a common carrier, the planet gears of a planet gear train will be referred to collectively as a carrier gear. With this arrangement, carriers gears 21R, 21L rotate at a speed reduced by a specified reduction gear ratio, and the output shafts 10R, 10L also rotate at the same rotation rate as a result of the drive hubs 15R, 15L being directly coupled to carrier gears 21R, 21L.

In the braking mode, the high speed clutches 13R, 13L and the low speed clutches 12R, 12L are released. Therefore, the torque transmission from the input shaft 9 to the output shafts 10R, 10L is interrupted. Simultaneously, the brakes 11R, 11L are engaged, and therefore the brake hubs 22R, 22L directly couple the output shafts 10R, 10L to the fixed housings 17R, 17L. Thus, the output shafts 10R, 10L and the related track shoes 2, 3 are braked.

The right and left geared steering device components 8R, 8L enable the crawler vehicle to turn on a radius of approximately 10 meters at a specified gear ratio without any braking loss in its movement. The geared steering device components 8R, 8L and the operating brakes 11R, 11L also provide the functions of a known clutch/brake type turning device.

However, such geared steering device components 8R, 8L include a problem in that they require a total of six discs for the high speed clutches 13R, 13L, the low speed clutches 12R, 12L, and the brakes 11R, 11L. Similarly, a total of six sets of hydraulic control valves has been required for the rightside and leftside control mechanisms for controlling these discs. As a large number of such component parts is required, the control system for the geared steering device is expensive.

The vehicle is provided with the high speed clutches 13R, 13L and the low speed clutches 12R, 12L at its rightside and its leftside, and therefore a high speed stage or a low speed stage can be provided both at the rightside and at the leftside of the vehicle. Accordingly, if a three stage transmission is provided, the forward vehicle speeds and the rearward vehicle speeds can be shifted in six steps. However, such transmission system would be excessive for a vehicle for which three forward speeds and three rearward speeds are sufficient.

A control system for a crawler vehicle having a conventional clutch/brake type steering device has been proposed in the Published Japanese Translations of PCT Patent Applications from Other Countries No. 501054-1989. Specifically, this reference has disclosed a technology for a feedback control of a hydraulic pressure of the clutches or brakes so that a designated turning radius of the vehicle, which is determined in accordance with the amount of operation of the steering lever, can be obtained by sensing the rotation rates of the rightside and leftside track shoe drive shafts.

However, a feedback control technique capable of providing a designated turning radius for a crawler vehicle, which is determined in accordance with the amount of the operating stroke of the steering lever, has not yet been disclosed for the control system for a crawler vehicle having a geared steering device. If a crawler vehicle having a geared steering device is not provided with a feedback control technique, there is a danger that a reverse movement to the lever operation by the operator, i.e. reverse steering, may be caused, depending on the degree of the load which acts on the crawler vehicle.

SUMMARY OF THE INVENTION

An object of the present invention, made to solve the problems of the control system for a crawler vehicle having a geared steering device according to the prior art, is to provide a geared steering device for a crawler vehicle and a control system therefor capable of selectively actuating the rightside and leftside drive mechanisms and ensuring the efficient steering of the crawler vehicle.

A geared steering device is provided for a crawler vehicle, having brakes, high speed clutches, and low speed clutches which are selectively engaged or disengaged, and planet gear trains to receive a driving power of a prime mover at an input shaft, to control the rightside and leftside output shafts for high speed rotation, low speed rotation, and braking to thereby control the steering of the rightside and leftside track shoes of the crawler vehicle.

A geared steering device in accordance with the invention comprises a power input drive element adapted to receive driving power from the prime mover; a fixed housing; a first steering brake for engaging and releasing a first output shaft with respect to the fixed housing; a first rotatable housing coupled to the first output shaft; a first direct-coupled clutch for selectively engaging and releasing the first rotatable housing with respect to the power input drive element; and a center shaft. A first planet gear train has a first sun gear, a first carrier gear, and a first ring gear; with each of the first sun gear, the first carrier gear, and the first ring gear being connected to a respective different one of the center shaft, the power input drive element, and the first rotatable housing. In a presently preferred embodiment, the first sun gear is directly connected to the center shaft, the first carrier gear is directly connected to the power input drive element, and the first ring gear is directly connected to the first rotatable housing.

The geared steering device further comprises a second steering brake for engaging and releasing the second output shaft with respect to a fixed housing; a second rotatable housing coupled to the power input drive element; and a drive hub coupled to the second output shaft. A second planet gear train has a second sun gear, a second carrier gear, and a second ring gear; with each of the drive hub and the center shaft being connected to a respective different one of the second sun gear, the second carrier gear, and the second ring gear. A second direct-coupled clutch is provided for selectively engaging and releasing the second rotatable housing with respect to the second carrier gear.

The geared steering device further comprises a variable capacity hydraulic pump having a discharge control device, a hydraulic turning motor driven by pressurized hydraulic fluid from the pump, a turn clutch, and a turn clutch hub driven by a power output shaft of the hydraulic turning motor via the turn clutch. A third planet gear train has a third sun gear, a third carrier gear, and a third ring gear; with each of the second rotatable housing and the turn clutch hub being connected to a respective different one of the third sun gear, the third carrier gear, and the third ring gear, wherein the gear of the second planet gear train other than the gears connected to the center shaft and the drive hub is coupled with a gear of the third planet gear train other than the gears of the third planet gear train which are connected to the turn clutch hub and the second rotatable housing.

In a first embodiment, the second sun gear can be provided on the center shaft, and the second carrier gear can be coupled to the drive hub. The third sun gear can be provided on the turn clutch hub, and the third ring gear can be provided on the second rotatable housing, whereby the second ring gear is coupled to the third carrier gear.

In a second embodiment, the third carrier gear can be coupled to the second rotatable housing, and the second ring gear can be coupled to the third ring gear. In a third embodiment, the second ring gear can be coupled to the center shaft and the second sun gear can be coupled to the third carrier gear.

In addition, a control system is provided which comprises a controller capable of comparing a designated steering ratio, established responsive to a desired turning radius inputted by the operator via a steering lever, with an actual steering ratio, calculated from a rotation rate of the power input drive element of the geared steering device and a rotation rate of the turn clutch hub. The controller is capable of outputting a control signal for a direct-coupled clutch, the turn clutch or a steering brake for causing the actual steering ratio to approach and closely approximate the designated steering ratio. The control signal can be outputted to a solenoid valve for controlling a direct-coupled clutch, the turn clutch or a steering brake. Furthermore, an engaging signal can be outputted to the direct-coupled clutch for the side opposite to the steering direction inputted by the steering lever.

For straight travel, the controller outputs a zero discharge signal to the discharge control device of the variable capacity hydraulic pump to thereby stop the hydraulic turning motor, and outputs control signals to respective solenoid control valves to completely release the turn clutch and both steering brakes and to completely engage both direct-coupled clutches. Therefore, both output shafts rotate at the same rotation rate.

For a low speed turning in a larger radius than specified by the geared steering ratio, which is determined by the type of gear train of the geared steering device and the number of gear teeth, the controller outputs control signals to the solenoid control valves to completely engage the turn clutch and the direct-coupled clutch for the direction opposite to the steering direction, and to completely release the direct-coupled clutch for the steering direction and both steering brakes. The controller receives a signal representative of the rotation rate of the power input drive element of the geared steering device and a signal representative of the rotation rate of the turn clutch hub, and calculates an actual steering ratio from these rotation rates. The controller also receives a signal representative of the desired turning radius, as outputted from the operation lever, and calculates a designated steering ratio. The controller compares the designated steering ratio with the actual steering ratio and outputs to the discharge control device a correction signal to vary the operation of the turning motor to cause the actual steering ratio to approach and closely approximate the designated steering ratio.

For a geared steering operation at the geared steering ratio, which is determined by the type of gear train of the geared steering device and the number of gear teeth, the controller outputs to the discharge control device a zero discharge signal to thereby stop the hydraulic turning motor, and outputs control signals to respective solenoid control valves to completely engage the turn clutch and the direct-coupled clutch for the direction opposite to the steering direction, and to completely release the direct-coupled clutch for the steering direction and both steering brakes.

For a low speed turn in a smaller turning radius than specified by the geared steering ratio, which is determined by the type of gear train of the geared steering device and the number of gear teeth, the controller outputs to the discharge control device a zero discharge signal to thereby stop the hydraulic turning motor, and outputs to respective solenoid control valves control signals to completely release the turn clutch and the steering brake for the direction opposite to the steering direction, and to completely engage the direct-coupled clutch for the direction opposite to the steering direction. The controller receives a signal representative of the rotation rate of the power input drive element of the geared steering device and a signal representative of the rotation rate of the turn clutch hub, and calculates an actual steering ratio from these rotation rates. The controller also receives a signal representative of the desired turning radius, as outputted by the operation lever, and calculates a designated steering ratio. The controller then compares the calculated actual steering ratio with the designated steering ratio, and outputs correction signals to respective solenoid control valves to cause the actual steering ratio to approach and closely approximate the designated steering ratio under the condition that one of the steering brake for the steering direction and the direct-coupled clutch for the steering direction is only partially engaged and the other is completely released.

For a pivot turn, the controller outputs a zero discharge signal to the discharge control device to thereby stop the hydraulic turning motor, and outputs control signals to respective solenoid control valves to completely release the turn clutch, the direct-coupled clutch for the steering direction, and the steering brake for the direction opposite to the steering direction, and to completely engage the steering brake for the steering direction and the direct-coupled clutch for the direction opposite to the steering direction.

When a low speed turn in a larger turning radius than specified by the geared steering ratio, which is determined by the type of gear train of the geared steering device and the number of gear teeth, is commanded by the operation lever, the controller outputs to respective solenoid control valves control signals to completely engage the turn clutch and the direct-coupled clutch for the direction opposite to the steering direction and to release the other clutches and brakes. The controller receives a signal representative of the rotation rate of the power input drive element, a signal representative of the rotation rate of the turn clutch hub of the geared steering device, and a signal representative of the designated turning radius as outputted from the operating lever, determines a designated steering ratio responsive to the designated turning radius, compares the designated steering ratio with an actual steering ratio calculated from these rotation rates, and outputs a correction signal to the discharge control device for controlling the amount of discharge of the variable capacity hydraulic pump to make the turning motor rotate at the rotation rate which is necessary in order to cause the actual steering ratio to approach and closely approximate the designated steering ratio.

When the geared steering at the geared steering ratio is commanded by the operation lever, the controller outputs to respective solenoid control valves the control signals to engage the turn clutch and the direct-coupled clutch for a direction opposite to the steering direction and to release the other clutches and brakes, and outputs to the discharge control device a signal for zeroing the amount of discharge of the variable capacity hydraulic pump to thereby stop the hydraulic turning motor.

When a low speed turn in a smaller turning radius than specified by the geared steering ratio, which is determined by the type of gear train of the geared steering device and the number of gear teeth, is commanded by the operation lever, the controller outputs to the discharge control device a signal for zeroing the amount of discharge of the variable capacity hydraulic pump to thereby stop the hydraulic turning motor. The controller also outputs to respective solenoid control valves the control signals to completely release the turn clutch and the steering brake for the direction opposite to the steering direction, and to completely engage the direct-coupled clutch for the direction opposite to the steering direction. The controller receives a signal representative of the rotation rate of the power input drive element, a signal representative of the rotation rate of the turn clutch hub of the geared steering device, and a signal representative of the designated turning radius as outputted from the operating device, determines the designated steering ratio from the designated turning radius, compares the designated steering ratio with an actual steering ratio calculated from these rotation rates, and outputs to respective solenoid control valves correction signals to cause the actual steering ratio to approximate the designated steering ratio under a condition that one of the steering brake for the steering direction and the direct-coupled clutch for the steering direction is partially engaged and the other is completely released.

When a pivot turn is commanded by the operation lever, the controller outputs to the discharge control device a signal for zeroing the amount of discharge of the variable capacity hydraulic pump to thereby stop the hydraulic turning motor. The controller also outputs to respective solenoid control valves the control signals to completely release the turn clutch, the direct-coupled clutch for the steering direction, and the steering brake for the direction opposite to the steering direction, and to completely engage the steering brake for the steering direction and the direct-coupled clutch for the direction opposite to the steering direction.

DETAILED DESCRIPTION OF THE PREFERRED EMBODIMENTS

Referring to FIGS. 1, 2, 5 and 6, a first embodiment of the present invention is illustrated in detail.

Figure 1:
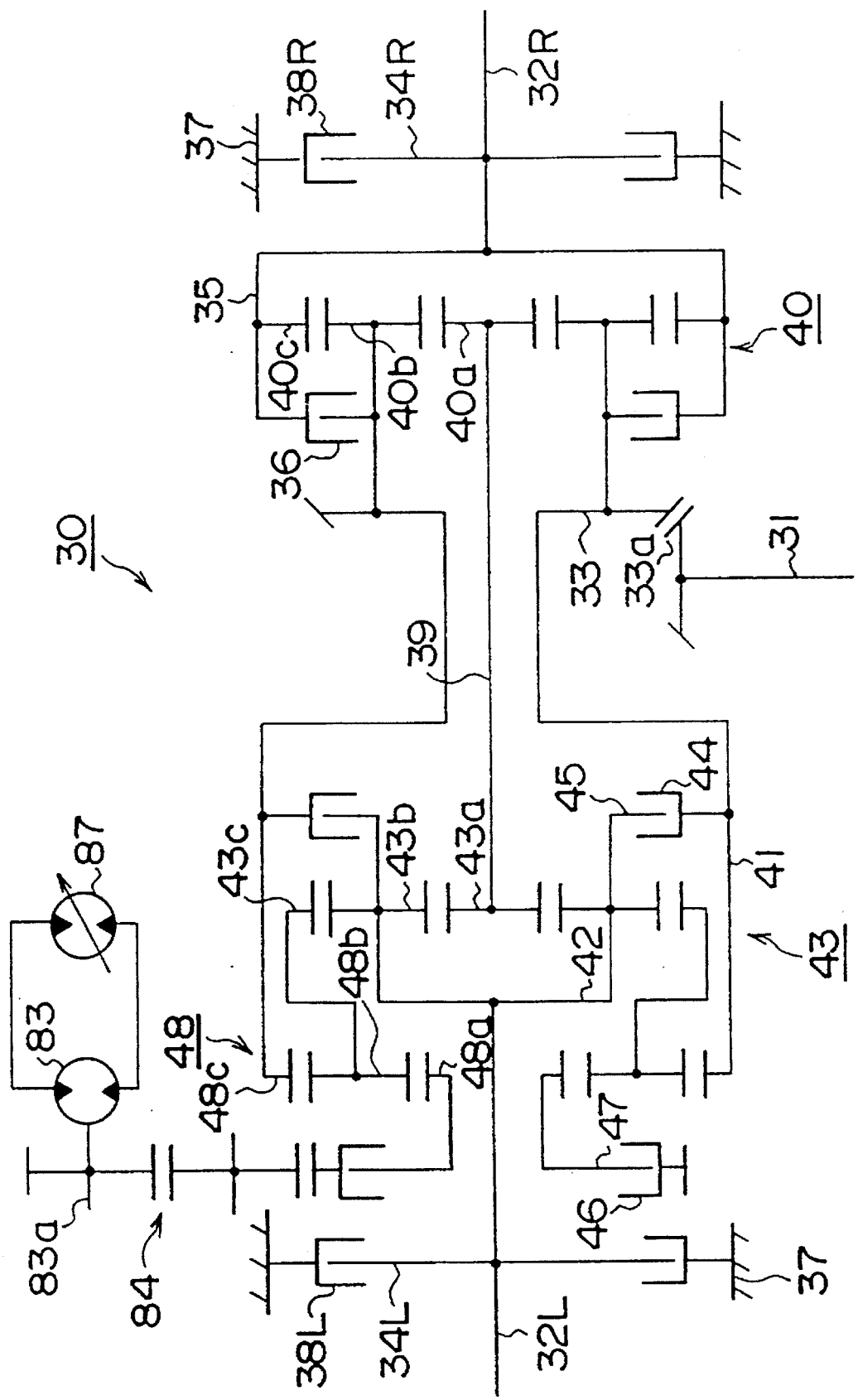
FIG. 1 is a skeleton illustration of a first embodiment of a geared steering device in accordance with the present invention.
Figure 5:
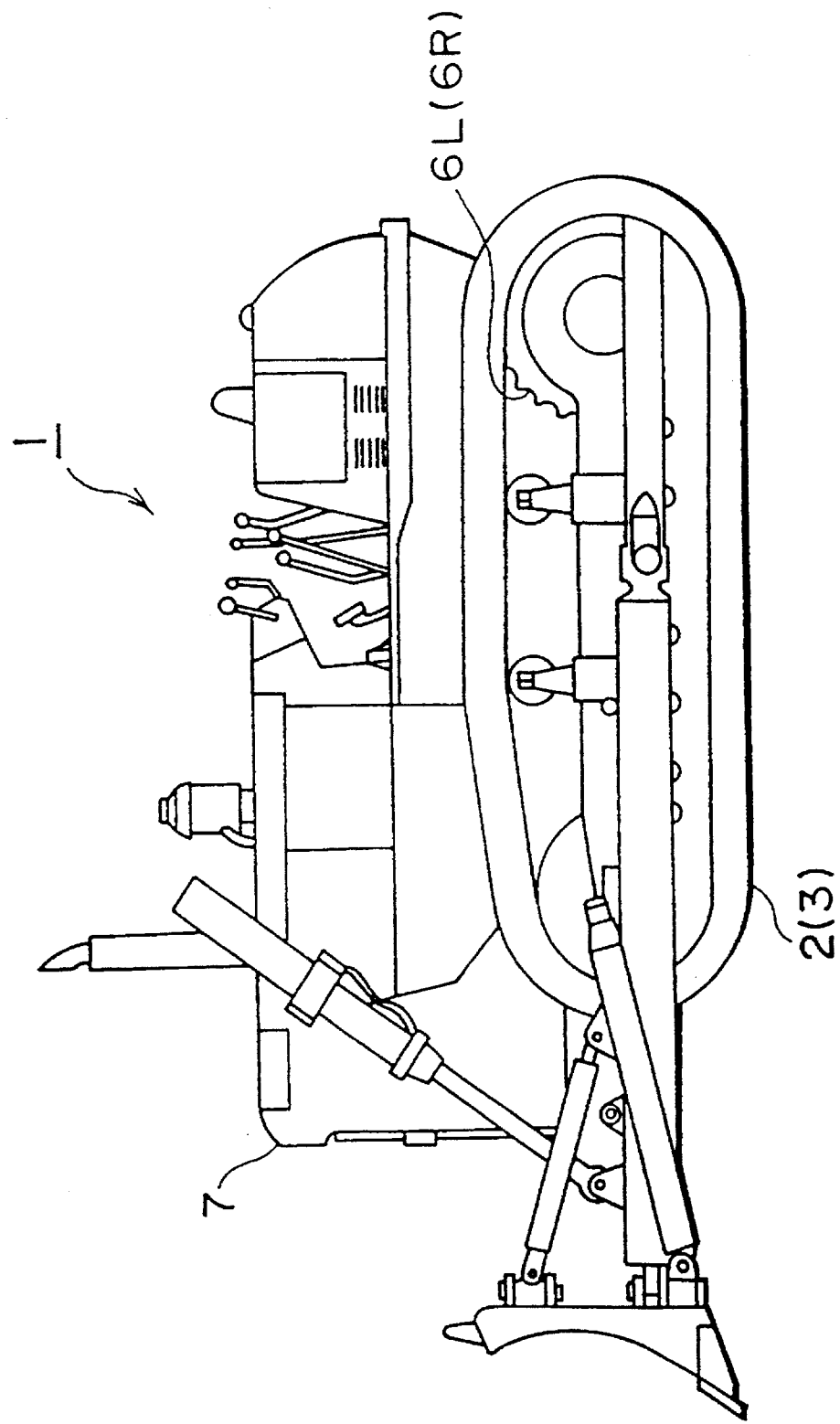
FIG. 5 is a side elevational view of a crawler vehicle.
Figure 6:
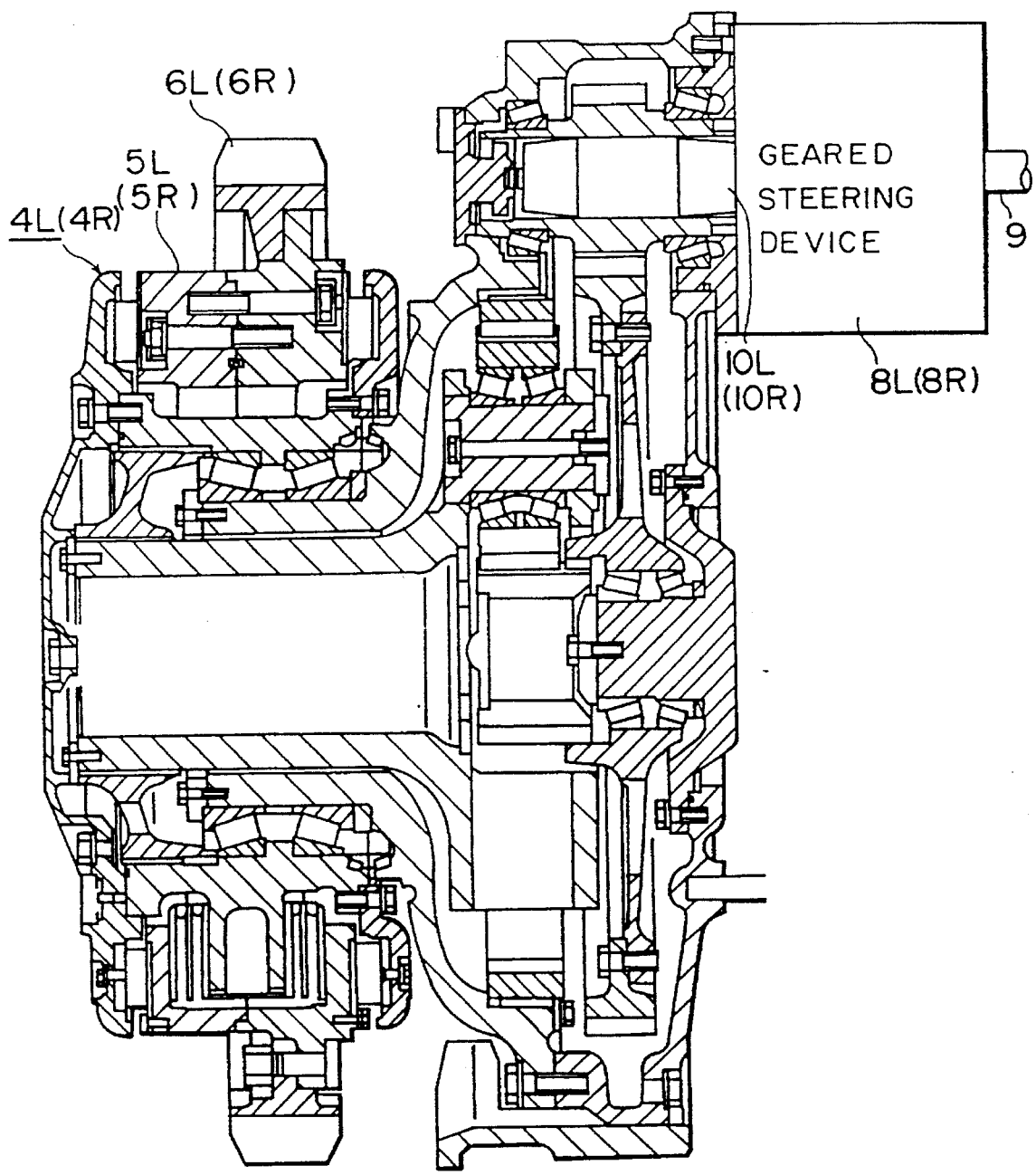
FIG. 6 is a sectional view of a final reduction gear apparatus connected to a geared steering device for a crawler vehicle.

A geared steering device 30, for use in a crawler vehicle and having a gear skeleton as shown in FIG. 1, receives a driving power of a prime mover 7 (FIG. 5) through a power input shaft 31 and delivers it through a left power output shaft 32L and a right power output shaft 32R. The driving force from the left power output shaft 32L is transmitted to the left sprocket 6L by the left final reduction gear 4L, while the driving force from the right power output shaft 32R is transmitted to the right sprocket 6R by the right final reduction gear 4R, as shown in FIG. 6, to drive leftside and rightside track shoes 2, 3 of a crawler vehicle 1 as shown in FIG. 5.

The geared steering device 30 comprises a power input drive element 33 for receiving power from the power input shaft 31 through a bevel gear 33a, a first rotatable housing 35 coupled to a rightside power output shaft 32R, a rightside steering brake hub 34R coupled to the rightside power output shaft 32R, a rightside direct-coupled clutch 36 for selectively engaging and disengaging the first rotatable housing 35 and the power input drive element 33, a rightside steering brake 38R connected to a fixed housing 37 for selectively engaging and disengaging the rightside brake hub 34R, a center shaft 39 arranged on the same axial line as the rightside power output shaft 32R, and a first planet gear train 40. The first planet gear train 40 comprises a sun gear 40a coupled to the center shaft 39, a carrier gear 40b coupled to the power input drive element 33, and a ring gear 40c coupled to the first rotatable housing 35.

The geared steering device 30 further comprises a second rotatable housing 41 coupled to the power input drive element 33, a drive hub 42 which is coupled to a leftside power output shaft 32L, a leftside brake hub 34L connected to the leftside power output shaft 32L, a second planet gear train 43, and a third planet gear train 48. The second planet gear train 43 comprises a sun gear 43a coupled to the center shaft 39, a carrier gear 43b coupled to the drive hub 42, and a ring gear 43c. A leftside direct-coupled clutch hub 45 is coupled to the carrier gear 43b of the second planet gear train 43 and is selectively connected to the second rotatable housing 41 by a leftside direct-coupled clutch 44. The third planet gear train 48 comprises a sun gear 48a coupled to a turn clutch hub 47, a carrier gear 48b connected to the ring gear 43c of the second planet gear train 43, and a ring gear 48c connected to the second rotatable housing 41.

A variable capacity hydraulic pump 87, having a hydraulic pump discharge control device (FIG. 9), supplies pressurized hydraulic fluid to a hydraulic turning motor 83. A power output shaft 83a of the hydraulic turning motor 83 selectively drives the turn clutch hub 47 through a gear train 84 and a turn clutch 46.

The relationships between the operation of the hydraulic turning motor 83, the engagement (ON) and the disengagement (OFF) of clutches 36, 44, 46 and steering brakes 38L, 38R, and the operations of the vehicle are as shown in Table 1 for straight travel and for turns in a counterclockwise direction and as shown in Table 2 for turns in a clockwise direction.

As shown in Table 1, the hydraulic turning motor 83 is fixed, both of the steering brakes 38L, 38R and a turn clutch 46 are completely released, and both of the direct-coupled clutches 36, 44 are completely engaged during straight travel of the vehicle. Therefore, the output shafts 32L, 32R are rotated at the same rotation rate.

TABLE 1

| | COUNTERCLOCKWISE TURN | | | | |
|---|---|---|---|---|---|
| | PIVOT TURN | SMALL-RADIUS TURN | GEARED STEERING | LARGE-RADIUS TURN | STRAIGHT TRAVEL |
| LEFTSIDE STEERING BRAKE 38L | ON | HALF-BRAKE OR OFF | OFF | OFF | OFF |
| HYDRAULIC TURNING MOTOR 83 | STOP | STOP | STOP | MOVE | STOP |
| TURN CLUTCH 46 | OFF | OFF | ON | ON | OFF |
| LEFTSIDE DIRECT-COUPLED CLUTCH 44 | OFF | OFF OR HALF-CLUTCH | OFF | OFF | ON |
| RIGHTSIDE DIRECT-COUPLED CLUTCH 36 | ON | ON | ON | ON | ON |
| RIGHTSIDE STEERING BRAKE 38R | OFF | OFF | OFF | OFF | OFF |

TABLE 2

| | CLOCKWISE TURN | | | |
|---|---|---|---|---|
| | PIVOT TURN | SMALL-RADIUS TURN | GEARED STEERING | LARGE-RADIUS TURN |
| LEFTSIDE STEERING BRAKE 38L | OFF | OFF | OFF | OFF |
| HYDRAULIC TURNING MOTOR 83 | STOP | STOP | STOP | MOVE |
| TURN CLUTCH 46 | OFF | OFF | ON | ON |
| LEFTSIDE DIRECT-COUPLED CLUTCH 44 | ON | ON | ON | ON |

TABLE 2-continued

| | CLOCKWISE TURN | | | |
|---|---|---|---|---|
| | PIVOT TURN | SMALL-RADIUS TURN | GEARED STEERING | LARGE-RADIUS TURN |
| RIGHTSIDE DIRECT-COUPLED CLUTCH 36 | OFF | OFF OR HALF-CLUTCH | OFF | OFF |
| RIGHTSIDE STEERING BRAKE 38R | ON | HALF-CLUTCH OR OFF | OFF | OFF |

In a counterclockwise turn in a larger turning radius than is specified by a geared steering ratio, which is determined in accordance with the number of teeth of the gear train of the geared steering device 30, the steering brakes 38L, 38R and the leftside direct-coupled clutch 44 are released, while the turn clutch 46 and the rightside direct-coupled clutch 36 are engaged, and the rotation of the hydraulic turning motor 83 is transmitted to the geared steering device 30.

In a counterclockwise turn according to the geared steering ratio, the hydraulic turning motor 83 is stopped, the turn clutch 46 and the rightside direct-coupled clutch 36 are engaged, and the other clutches and brakes are released.

In a counterclockwise turn in a smaller turning radius than is specified by the geared steering ratio, the hydraulic turning motor 83 is stopped, the turn clutch 46 and the rightside steering brake 38R are completely released, the rightside direct-coupled clutch 36 is completely engaged, and one of the leftside steering brake 38L or the leftside direct-coupled clutch 44 is half-engaged while the other is completely released.

In a counterclockwise pivot turn, the hydraulic turning motor 83 is stopped; the turn clutch 46, the leftside direct-coupled clutch 44, and the rightside steering brake 38R are released; and the leftside steering brake 38L and the rightside direct-coupled clutch 36R are completely engaged. Therefore, the leftside track shoe 2 is stopped while the rightside track shoe 3 rotates at the same rotation rate as the input rotation rate, and the vehicle is pivotally rotated in a counterclockwise direction.

A detailed description of the clockwise turning operations represented in Table 2 is omitted since these operations are the same as the counterclockwise turning operations except for the reversal of direction orientation.

Figure 2:
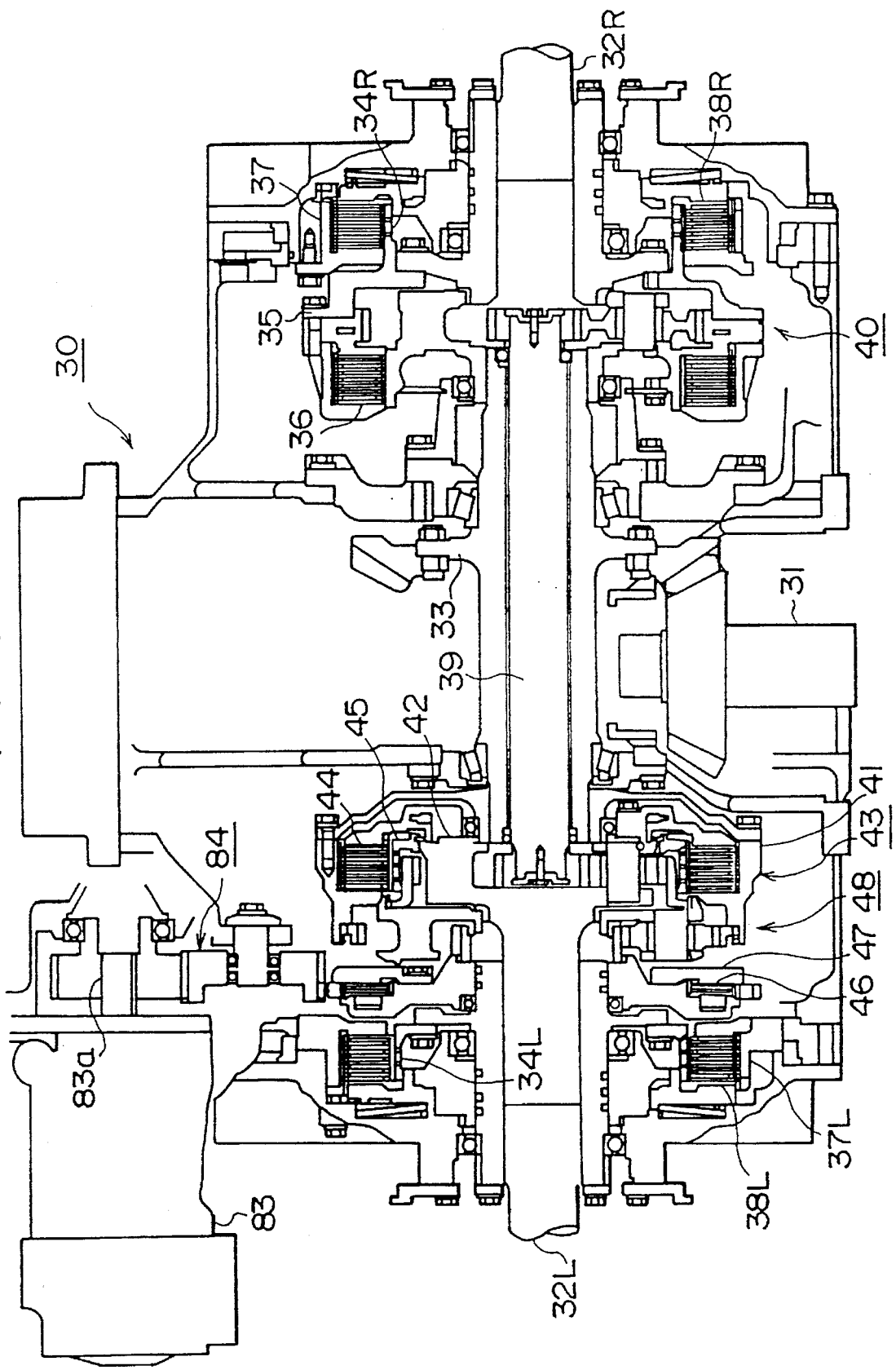
FIG. 2 is an elevational view of the geared steering device of FIG. 1.

As the geared steering device 30 illustrated in FIG. 2 has a physical structure corresponding to the skeleton of the geared steering device 30 shown in FIG. 1, the components in FIG. 2 which are the same as those shown in FIG. 1 are given the same reference numerals and symbols, and a detailed description of the configuration and operation thereof will not be repeated.

Figure 3:
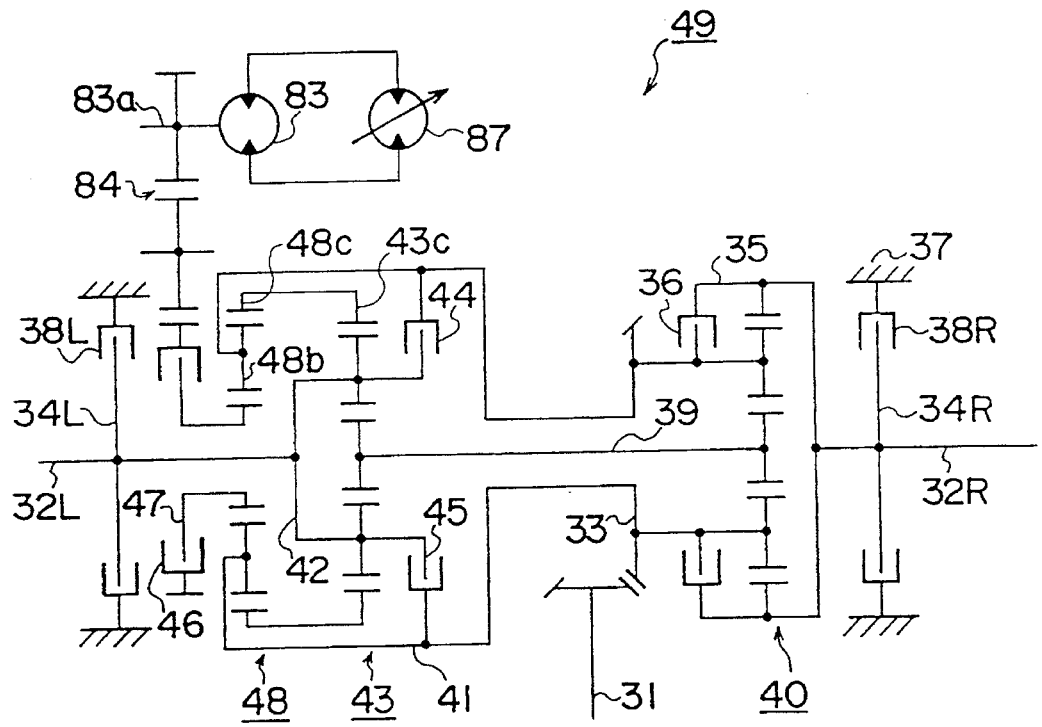
FIG. 3 is a skeleton illustration of a second embodiment of a geared steering device in accordance with the present invention.

FIG. 3 illustrates a gear skeleton of a geared steering device 49 for crawler vehicles in accordance with a second embodiment of the invention. The components in FIG. 3 which are the same as those of the skeleton of the geared steering device 30 shown in FIG. 1 are given the same reference numerals and symbols, and the description of the configuration thereof will not be repeated. FIG. 3 differs from FIG. 1 in that the carrier gear 48b of the third planet gear train 48 is coupled to the second rotatable housing 41 rather than to the ring gear 43c of the second planet gear train 43, while the ring gear 48c of the third planet gear train 48 is coupled to the ring gear 43c of the second planet gear train 43 rather than to the second rotatable housing 41. The description of operations of the geared steering device 49 shown in FIG. 3 is omitted because it is similar to that for the geared steering device 30 of FIG. 1.

Figure 4:
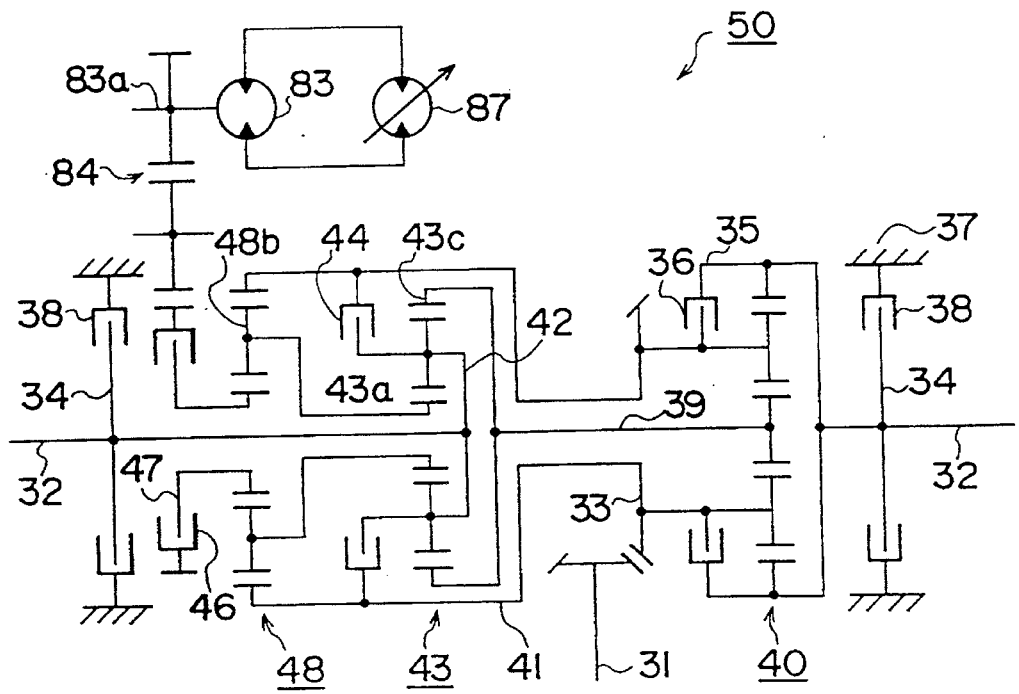
FIG. 4 is a skeleton illustration of a third embodiment of a geared steering device in accordance with the present invention.

FIG. 4 illustrates a gear skeleton of a geared steering device 50 for crawler vehicles in accordance with a third embodiment of the invention. The components in FIG. 4 which are the same as those of the skeleton of the geared steering device 30 shown in FIG. 1 are given the same reference numerals and symbols, and the description of the configuration thereof will not be repeated. FIG. 4 differs from FIG. 1 in that the ring gear 43c of the second planet gear train 43 is coupled to the center shaft 39 rather than to the carrier gear 48b of the third planet gear train 48, while the sun gear 43a of the second planet gear train 43 is coupled to the carrier gear 48b of the third planet gear train 48 rather than to the center shaft 39. The description of the operation of the geared steering device 50 in FIG. 4 is omitted because it is similar to that for the geared steering device 30 of FIG. 1.

Figure 7:
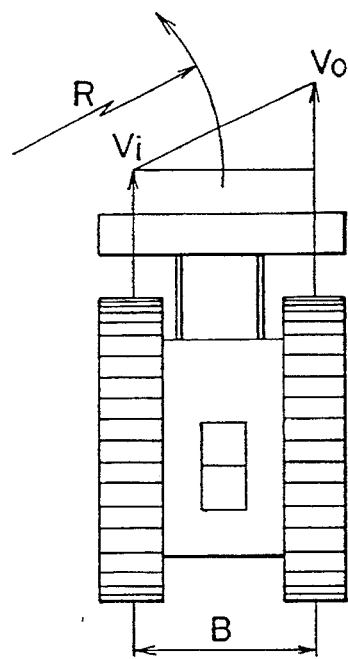
FIG. 7 is an illustration of a crawler vehicle in a turning operation.
Figure 8:
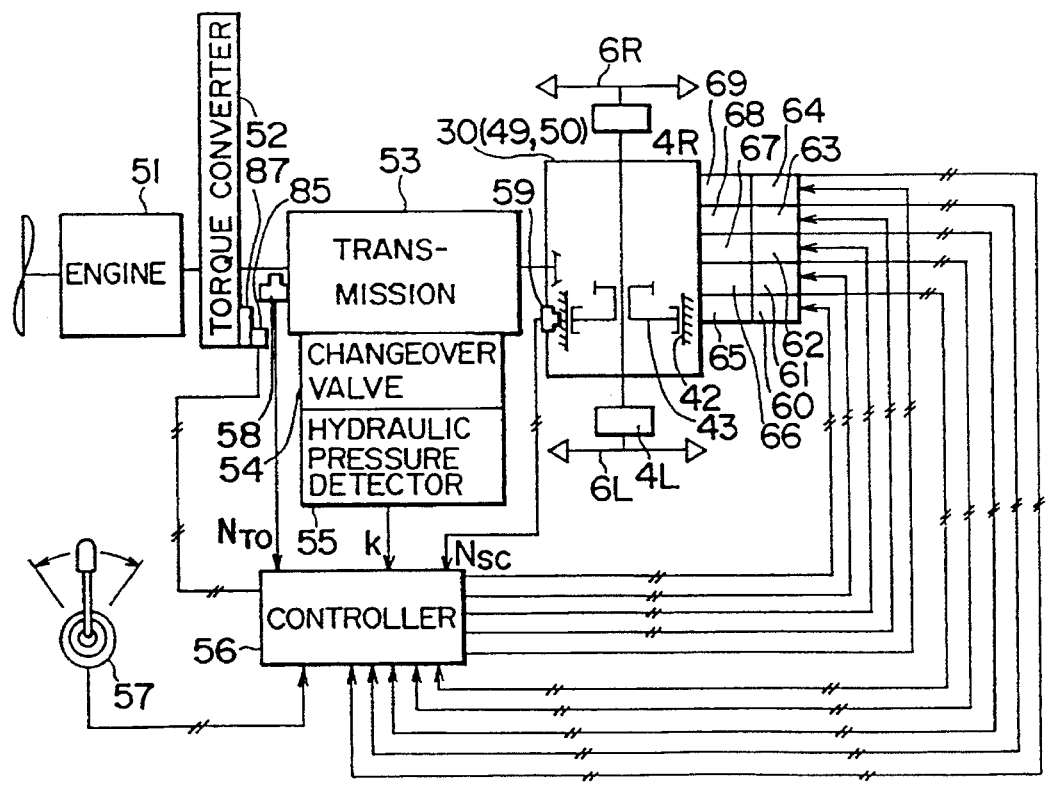
FIG. 8 is an illustration of a control system for a geared steering device according to the present invention.
Figure 9:
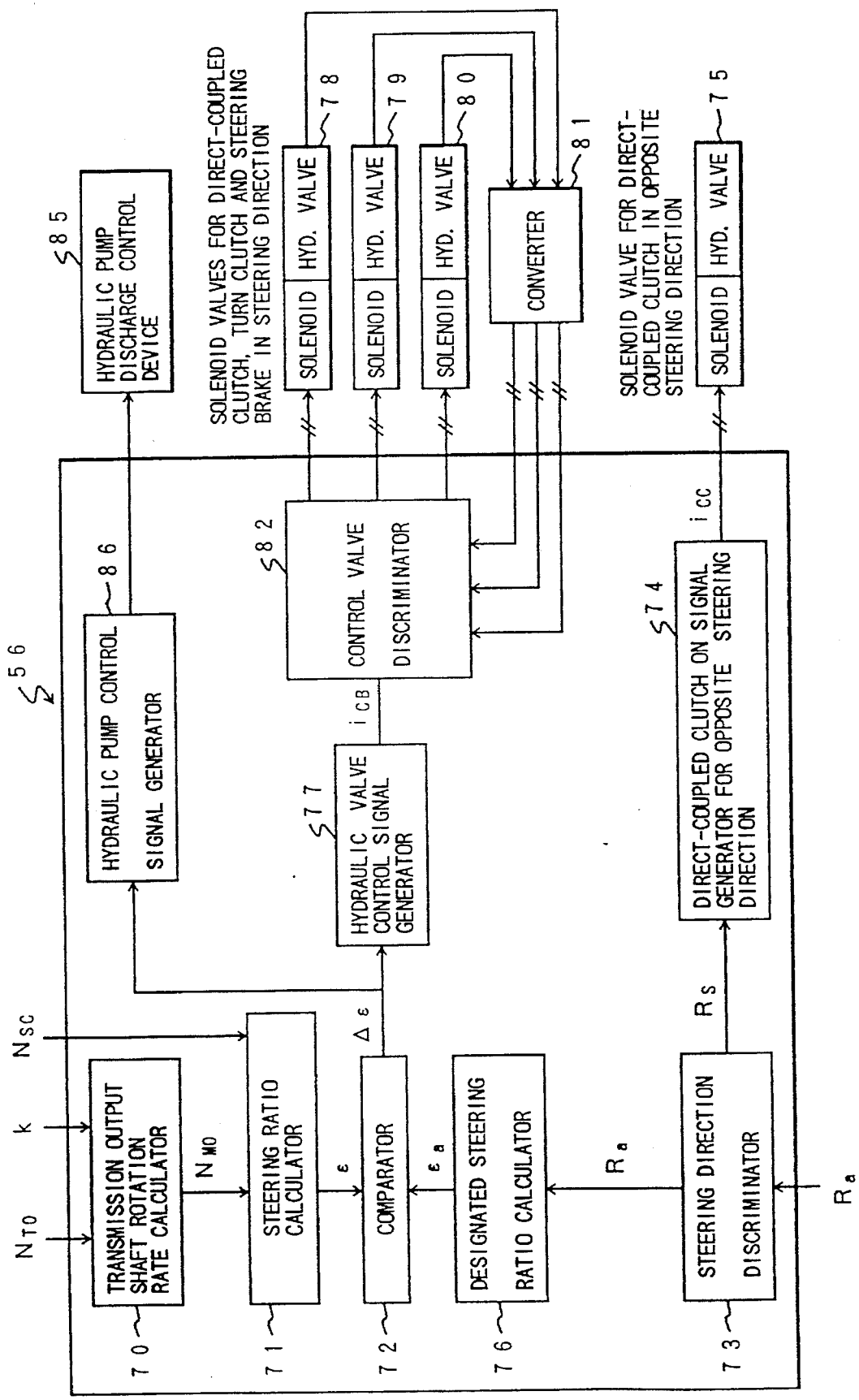
FIG. 9 is a detailed illustration of the controller shown in FIG. 8.
Figure 10:
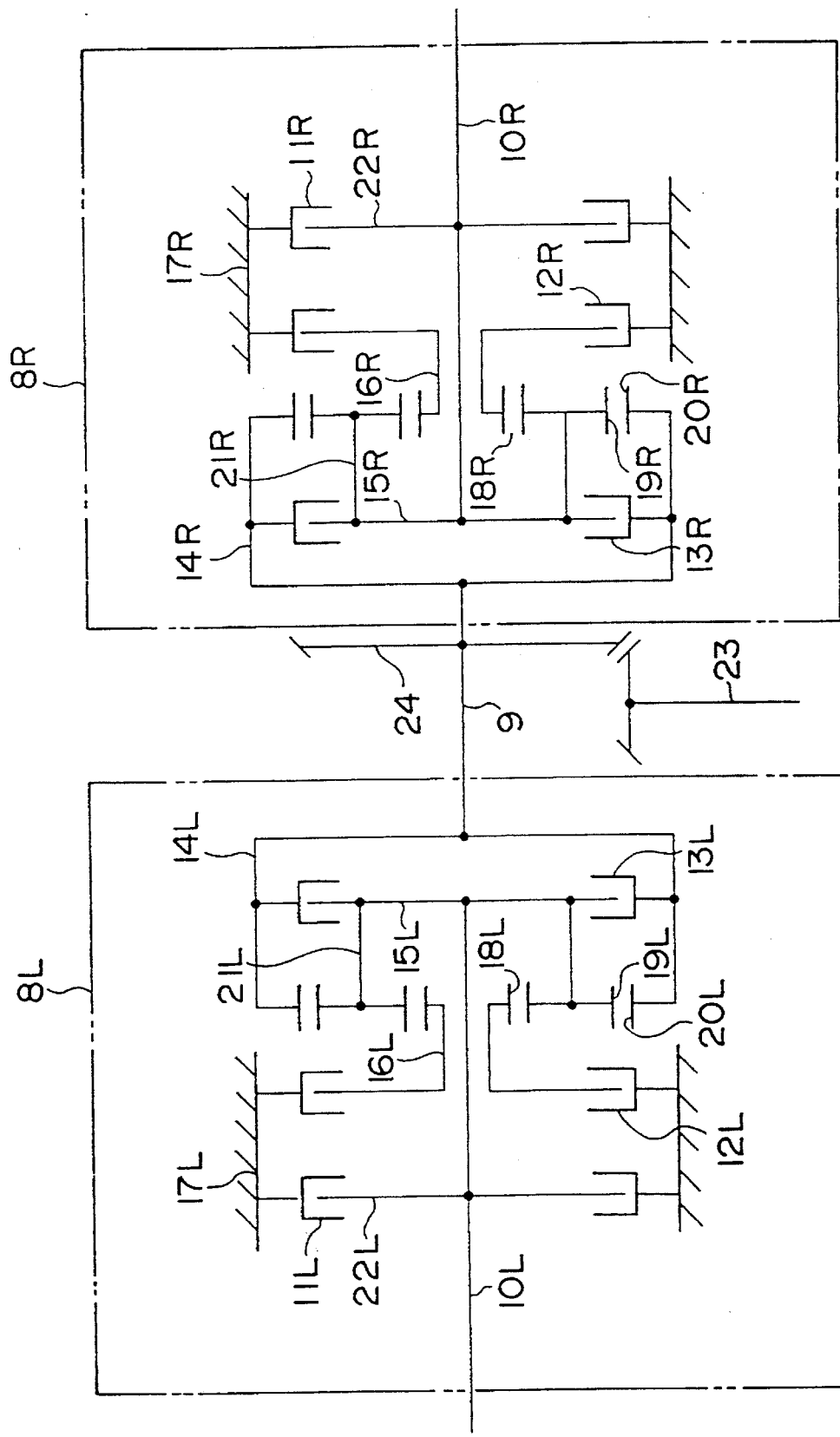
FIG. 10 is an illustration of a gear skeleton of a conventional geared steering device.

FIGS. 7 to 9 illustrate a control system which can be employed with each of the geared steering devices 30, 49 and 50.

The turning radius R of the crawler vehicle can be given as below since the steering ratio $\epsilon = V_o/V_i$, where $V_o$ is the speed of the outside track, $V_i$ is the speed of the inside track, and B is the gauge width (distance between the centerlines of the two tracks), as shown in FIG. 7:

$$R = \{(\epsilon+1)/(\epsilon-1)\} \cdot (B/2) \qquad (1)$$

Where, for example, the leftside geared steering ratio is assumed as $\epsilon_{LO}$, Z is the number of teeth of a gear, "R" denotes a ring gear, "S" denotes a sun gear, "1" denotes the first planet gear train, and "2" denotes the second planet gear train, a steering ratio can be expressed as shown below:

$$1/\epsilon = \{Z_{R2}/(Z_{R2}+Z_{S2})\} \cdot \{Z_{S1}/(Z_{S1}+Z_{R1})\} \cdot \rho_B \cdot (N_{SC}/N_{MO}) + (1/\epsilon_{LO}) \qquad (2)$$

where:

$$1/\epsilon_{LO} = \{Z_{R2}/(Z_{R2}+Z_{S2})\} \cdot [\{Z_{R1}/(Z_{R1}+Z_{S1})\} + (Z_{S2}/Z_{R2})] \qquad (3)$$

where $\rho_B$=Reduction ratio from the transmission output shaft to the power input shaft 31

$N_{SC}$=Rotation rate of the turn clutch hub $N_{MO}$=Rotation rate of the transmission output shaft In other words, if the turn clutch hub rotation rate $N_{SC}$ is detected and the transmission output shaft rotation rate $N_{MO}$ is calculated from the output rotation rate $N_{TO}$ of the torque converter and the speed step k of the transmission, the current turning radius R can always be determined from equations (1), (2) and (3) as described below.

A designated steering ratio $\epsilon_a$ is calculated from equation (1) so as to obtain the turning radius $R_a$ of the crawler vehicle 1 which the operator indicated by operating the operation lever 57. The ratio "turn clutch hub rotation rate $N_{SC}$/transmission output shaft rotation rate $N_{MO}$" is calculated from equation (2) by using the steering ratio $\epsilon_a$. Thus, the turning radius $R_a$ which the operator desires can be obtained by controlling hydraulic pressures for the direct-coupled clutches 36, 44, the turn clutch 46, and the steering brakes 38L and 38R, and the hydraulic turning motor 83 so as to obtain the target value of the steering ratio $N_{SC}/N_{MO}$, and also controlling the discharge control device 85 of the variable capacity hydraulic pump 87 so that the hydraulic turning motor 83 reaches the necessary rotation rate. The description of the clockwise turning is omitted since it is similar to that of the counterclockwise turning.

As known from the gear trains in FIGS. 1 to 4, the inside speed $V_i$ in either a counterclockwise turn or a clockwise turn can be denoted as a linear expression of the turn clutch hub rotation rate $N_{SC}$ and the transmission output shaft rotation rate $N_{MO}$, and the outside speed $V_o$ is proportional to the transmission output shaft rotation rate $N_{MO}$. Specifically, even if one of the steering brakes 38L, 38R and clutches 36, 44 is half-engaged and the hydraulic turning motor 83 is actuated, a change always appears as a change in the turn clutch hub rotation rate $N_{SC}$ and the transmission output rotation rate $N_{MO}$. Therefore, the turning radius R can be obtained from equation (1) by detecting the turn clutch hub rotation ratio $N_{SC}$ and the transmission output rotation rate $N_{MO}$ and calculating the steering ratio from equation (2).

FIG. 8 shows a control system for controlling the geared steering device 30, 49 or 50 according to the present invention. The output of an engine 51, serving as the prime mover, is connected through a torque converter 52 (hereinafter referred to as the "torcon") to a transmission 53. The output of the transmission 53 is the input shaft 31 of the geared steering device 30, 49 or 50. The rightside final reduction gear 4R and the leftside final reduction gear 4L are connected between the output shafts of the geared steering device 30, 49 or 50 and the respective drive sprockets 6R, 6L which are fixedly mounted on the final reduction gears 4R and 4L.

The output of a hydraulic pressure detector 55 for the speed step changeover valve 54 for transmission 53 is connected to a controller 56 to input to controller 56 a signal representative of the transmission speed step k. A steering lever 57 is manually actuated by the vehicle operator to input a signal to controller 56 representing the desired turning radius and steering direction. A torcon output shaft rotation sensor 58 transmits a signal to controller 56 representative of the rotation rate $N_{TO}$ of the torque converter output shaft, which is the input shaft for transmission 53. A rotation sensor 59 on the turn clutch hub 47, which forms part of the geared steering device 30, 49 or 50, transmits to the controller 56 a signal representative of the detected rotation rate $N_{SC}$ of the turn clutch hub 47.

The control elements include a solenoid control valve 60 for the leftside steering brake 38L, a solenoid control valve 61 for the turn clutch 46, a solenoid control valve 62 for the leftside direct-coupled clutch 44, a solenoid control valve 63 for the rightside direct-coupled clutch 36, a solenoid control valve 64 for the rightside steering brake 38R, a hydraulic valve 65 for the leftside steering brake 38L, a hydraulic valve 66 for the turn clutch 46, a hydraulic valve 67 for the leftside direct-coupled clutch 44, a hydraulic valve 68 for the rightside direct-coupled clutch 36, a hydraulic valve 69 for the rightside steering brake 38R, and a discharge control device 85 for the variable capacity hydraulic pump 87 for controlling the rotation of the hydraulic turning motor 83.

A detailed configuration of the controller 56 of FIG. 8 is illustrated in FIG. 9. The controller 56 calculates the transmission output shaft rotation rate $N_{MO}$ by entering both the torcon output shaft rotation rate $N_{TO}$, detected by the rotation sensor 58, and the transmission speed step k, detected by the hydraulic pressure detector 55, into the transmission output shaft rotation rate calculator 70. The actual steering ratio $\epsilon$ is calculated by entering both the calculated transmission output shaft rotation rate $N_{MO}$ and the turning clutch hub rotation rate $N_{SC}$ into the steering ratio calculator 71, and a signal representative of the actual steering ratio $\epsilon$ is outputted to the comparator 72.

On the other hand, when a signal of the desired turning radius $R_a$ designated by the vehicle operator is inputted from the steering lever 57 (FIG. 8) into the steering direction discriminator 73, a steering direction signal $R_s$ is outputted from the steering direction discriminator 73 to the opposite steering direction direct-coupled clutch ON signal generator 74. Then an engagement signal $i_{cc}$ is outputted from the opposite steering direction direct-coupled clutch ON signal generator 74 to the solenoid of the solenoid valve 75 for the opposite steering direction direct-coupled clutch.

Simultaneously, a designated turning radius command signal $R_a$ is outputted from the steering direction discriminator 73 to the designated steering ratio calculator 76. Then a designated steering ratio $\epsilon_a$ is calculated in the designated steering ratio calculator 76, and a signal representative of the designated steering ratio $\epsilon_a$ is outputted to the comparator 72.

The actual steering ratio $\epsilon$ and the designated steering ratio $\epsilon_a$ are compared in the comparator 72, and a steering ratio deviation signal $\Delta\epsilon$ is outputted to the hydraulic valve control signal generator 77. A hydraulic valve control signal $i_{CB}$, which makes the steering ratio deviation signal $\Delta\epsilon$ go to zero, is outputted from the hydraulic valve control signal generator 77 to the solenoid of the solenoid valve 78, 79 or 80 as designated by the control valve discriminator 82. Designation of solenoid valves by the control valve discriminator 82 is carried out by converter 81 converting the hydraulic pressure signals from the respective hydraulic pressure valves for solenoid valves 78, 79 and 80 for the direct-coupled clutch, the turn clutch and the steering brake in the steering direction, to electrical signals and outputting the converted signals to the control valve discriminator 82.

With the control system of FIG. 9, the turn clutch 46 is completely engaged when a control signal for complete engagement of the turn clutch 46 is outputted from the controller 56 to the solenoid valve 61 for control in a geared steering operation and in a low speed turning operation at a larger turning radius than in the geared steering operation.

When the steering ratio deviation signal $\Delta\epsilon$ from the comparator 72 is entered into the hydraulic pump control signal generator 86, a control signal which causes the steering ratio deviation signal $\Delta\epsilon$ to approximate zero is outputted from the hydraulic pump control signal generator 86 to the discharge control device 85 of the variable capacity hydraulic pump 87.

Operations of the geared steering device 30 shown in FIG. 1 are described below.

In straight travel, the turning motor 83 is stopped, the turn clutch 46 and both steering brakes 38L, 38R are released, and both direct-coupled clutches 36, 44 are engaged. Therefore, both output shafts 32L, 32R are rotated at the same rotation rate.

When a low speed counterclockwise turn with a larger turning radius than specified by a geared steering ratio, which is determined by the type of the gear train and the number of gear teeth of the geared steering device 30, is commanded by the operation lever 57 in FIG. 8, the controller 56 outputs control signals to the solenoid control valves 60–64 for completely engaging the turn clutch 46 and the rightside direct-coupled clutch 36, and for releasing the other clutch 44 and both of the brakes 38L, 38R. A signal representative of the rotation rate of the power input drive element 33 of the geared steering device 30 and a signal representative of the rotation rate of the turn clutch hub 47 are inputted to the controller 56, and the controller 56 calculates an actual steering ratio $\epsilon$ from these rotation rates. A signal representative of the designated turning radius $R_a$ is outputted by the operation lever 57 to the controller 56, which calculates a designated steering ratio $\epsilon_a$. The controller 56 compares the calculated actual steering ratio $\epsilon$ with the designated steering ratio $\epsilon_a$, and outputs to the discharge control device 85 a correction signal to cause the actual steering ratio $\epsilon$ to approach and closely approximate the designated steering ratio $\epsilon_a$. As a result, the crawler vehicle is turned counterclockwise at a low speed in a large turning radius R according to the designated steering ratio $\epsilon_a$ established responsive to the designated turning radius as given by the operation lever 57.

The rotation rate of the power input drive element 33 of the geared steering device 30 is measured by the torcon output shaft rotation sensor 58, the rotation rate of the turn clutch hub 47 is measured by the rotation sensor 59, and the resulting measurement signals are outputted to the controller 56.

When the leftside geared steering based on the above-described geared steering ratio is commanded by the operation lever 57, the controller 56 outputs to the solenoid control valves 60–64 the control signals to completely engage the turn clutch 46 and the rightside direct-coupled clutch 36 and to release the other clutch 44 and both of the brakes 38L, 38R. The controller 56 also outputs to the discharge control device 85 the zero discharge signal to thereby stop the hydraulic turning motor 83. Thus, the crawler vehicle is turned counterclockwise in a turning radius R based on the designated steering ratio $\epsilon_a$ established responsive to the desired turning ratio given by the operation lever 57.

When a low speed counterclockwise turn in a smaller turning radius than specified by the above-described geared steering ratio is designated by the operation lever 57, the controller 56 outputs to the discharge control device 85 a zero discharge signal for stopping the hydraulic turning motor 83. The controller 56 also outputs to the solenoid control valves 60–64 the control signals to completely release the turn clutch 46 and the rightside steering brake 38R and to completely engage the rightside direct-coupled clutch 36. A signal representative of the rotation rate of the power input drive element 33 of the geared steering device 30, a signal representative of the rotation rate of the turn clutch hub 47, and a signal representative of the designated turning radius $R_a$, as entered by the operation lever 57, are inputted to the controller 56. The controller 56 calculates the designated steering ratio $\epsilon_a$ from the designated turning radius $R_a$. The controller 56 then compares the designated steering ratio $\epsilon_a$ with the actual steering ratio $\epsilon$ calculated from these rotation rates, and outputs correction signals to the solenoid control valves for the leftside direct-coupled clutch 44 and the leftside steering brake 38L to partially engage one of the leftside direct-coupled clutch 44 and the leftside steering brake 38L while the other one of the leftside direct-coupled clutch 44 and the leftside steering brake 38L is completely released, to cause the actual steering ratio $\epsilon$ to approach and closely approximate the designated steering ratio $\epsilon_a$. As a result, the crawler vehicle turns counterclockwise at a low speed in a smaller turning radius based on the designated steering ratio $\epsilon_a$ established responsive to the desired turning radius indicated by the operation lever 57.

When a counterclockwise pivotal turn is commanded by the operation lever 57, the controller 56 outputs to the discharge control device 85 a zero discharge signal for stopping the hydraulic turning motor 83, and outputs to the solenoid control valves 60–64 the control signals to completely release the turn clutch 46, the leftside direct-coupled clutch 44, and the rightside steering brake 38, and to completely engage the leftside steering brake 38L and the rightside direct-coupled clutch 36. As a result, the leftside track shoe 2 is stopped, and the crawler vehicle is pivotally turned counterclockwise.

The present invention provides the following effects.

(1) Since six packs of clutches and brakes used according to the related art can be reduced to five packs, the geared steering devices 30, 49, and 50 can be made more compact than a steering device employing the six packs.

(2) One turn clutch, which is controlled in the most frequently employed braking operations, can serve for the two low speed clutches required in the related art. Therefore, the number of hydraulic control valves can be reduced, and the turning control can be smoothly carried out without variations between rightside and leftside mechanisms.

(3) Each of geared steering devices 30, 49 and 50 permits smooth turning control by the hydraulic turning motor in the control area where a low speed turn having a large turning radius is carried out, thereby avoiding any braking loss by the steering brakes during such turning operation.

(4) The operability in steering control is improved by automatic control in a control area other than geared steering operation, as in the case of relatively small radius turn or a pivot turn.

(5) The control system for geared steering devices 30, 49 and 50 can determine the steering ratio from only the rotation rate of the power input shaft and the rotation rate of the turn clutch hub, depending on the configuration of the gear train. Therefore, the control system can be simplified and can perform high precision control.

(6) The capacities of the variable capacity hydraulic pump and the hydraulic turning motor can be as large as approximately half of the total hydraulic steering system according to the prior art.

Reasonable variations and modifications of the invention are possible within the scope of the foregoing description and the attached drawings.

What is claimed is:

1. A geared steering device for a crawler vehicle having a prime mover, a rightside track shoe, a leftside track shoe, and rightside and leftside output shafts, for selectively operating the rightside and leftside output shafts at high speed rotation and low speed rotation, and for selectively braking said output shafts, to control steering of the rightside and leftside track shoes of the crawler vehicle, said geared steering device comprising:

a power input drive element adapted to receive driving power from the prime mover;

a fixed housing;

a first steering brake for selectively engaging and releasing a first one of the output shafts with respect to the fixed housing;

a first rotatable housing coupled to the first one of said output shafts;

a first direct-coupled clutch for selectively engaging and releasing said first rotatable housing with respect to said power input drive element;

a center shaft;

a first planet gear train having a first sun gear, a first carrier gear, and a first ring gear; each of said first sun gear, said first carrier gear, and said first ring gear being connected to a respective different one of said center shaft, said power input drive element, and said first rotatable housing;

a second steering brake for selectively engaging and releasing a second one of said output shafts with respect to a fixed housing;

a second rotatable housing coupled to the power input drive element;

a drive hub coupled to the second one of the output shafts;

a second planet gear train having a second sun gear, a second carrier gear, and a second ring gear; each of said drive hub and said center shaft being connected to a respective different one of the second sun gear, the second carrier gear, and the second ring gear;

a second direct-coupled clutch for selectively engaging and releasing said second rotatable housing with respect to the second carrier gear;

a third planet gear train having a third sun gear, a third carrier gear, and a third ring gear;

a turn clutch for selectively engaging and releasing a turn clutch hub which is connected to one of the gears of the third planet gear train;

a variable capacity hydraulic pump having a discharge control device; and a hydraulic turning motor for driving said turn clutch hub via the turn clutch;

wherein each of the second rotatable housing and the turn clutch hub is connected to a respective different one of the third sun gear, the third carrier gear, and the third ring gear;

wherein the gear of said second planet gear train other than the gears connected to the center shaft and the drive hub is coupled with a gear of the third planet gear train other than the gears of the third planet gear train which are connected to the turn clutch hub and the second rotatable housing.

2. A geared steering device in accordance with claim 1, further comprising an operator lever for indicating a desired turning radius and a desired steering direction; a plurality of solenoid valves, each of said plurality of solenoid valves controlling a respective one of the turn clutch, the first direct-coupled clutch, the second direct-coupled clutch, the first steering brake, and the second steering brake; and a controller which, during straight travel of the crawler vehicle, outputs a zero discharge signal to the discharge control device of said variable capacity hydraulic pump to stop said hydraulic turning motor, and outputs to respective solenoid valves control signals for completely releasing the turn clutch and both of the steering brakes and for completely engaging both of the direct-coupled clutches.

3. A geared steering device in accordance with claim 2, wherein the controller calculates a designated steering ratio and an actual steering ratio and compares the thus calculated actual steering ratio with the thus calculated designated steering ratio, and wherein, during a turn in a larger turning radius than specified by a geared steering ratio, the controller outputs to the discharge control device a correction signal responsive to the thus compared ratios for causing the actual steering ratio to approximate the designated steering ratio.

4. A geared steering device in accordance with claim 3, wherein, during a turn in a larger turning radius than specified by a geared steering ratio, the controller outputs to respective solenoid valves, in response to the operation lever indicating a turn towards a steering direction, control signals for completely engaging said turn clutch and a first one of the first and second direct-coupled clutches, and for completely releasing both of the steering brakes and a second one of the first and second direct-coupled clutches, wherein the second one of the first and second direct-coupled clutches corresponds to the steering direction while the first one of the first and second direct-coupled clutches corresponds to a direction opposite to the steering direction.

5. A geared steering device in accordance with claim 4, wherein, during a turn at a turning radius specified by a geared steering ratio, the controller outputs a zero discharge signal to the discharge control device of said variable capacity hydraulic pump to stop said hydraulic turning motor, and outputs to respective solenoid valves control signals for completely engaging said turn clutch and the first one of the first and second direct-coupled clutches, and for completely releasing both of the steering brakes and the second one of the first and second direct-coupled clutches.

6. A geared steering device in accordance with claim 5, wherein, during a turn at a turning radius smaller than specified by a geared steering ratio, the controller: outputs a zero discharge signal to the discharge control device of said variable capacity hydraulic pump to stop said hydraulic turning motor; outputs to respective solenoid valves control signals for completely releasing said turn clutch and a first one of the first and second steering brakes, and for completely engaging the first one of the first and second direct-coupled clutches; and outputs to respective solenoid valves control signals for the second one of the first and second direct-coupled clutches and the second one of the first and second steering brakes for causing the actual steering ratio to approximate the designated steering ratio in a state where one of the second one of the first and second steering brakes and the second one of the first and second direct-coupled clutches is partially engaged and the other one of the second one of the first and second steering brakes and the second one of the first and second direct-coupled clutches is released, wherein the second one of the first and second steering brakes corresponds to the steering direction while the first one of the first and second steering brakes corresponds to a direction opposite to the steering direction.

7. A geared steering device in accordance with claim 6, wherein, during a pivot turn, the controller outputs to said discharge control device a zero discharge signal for stopping said hydraulic turning motor, and outputs to respective solenoid valves control signals for completely releasing said turn clutch, the second one of the first and second direct-coupled clutches, and the first one of the first and second steering brakes, and for completely engaging the second one of the first and second steering brakes and the first one of the first and second direct-coupled clutches.

8. A geared steering device in accordance with claim 1, wherein the first sun gear is mounted on the center shaft, the first carrier gear is coupled to the power input drive element, and the first ring gear is mounted on the first rotatable housing.

9. A geared steering device in accordance with claim 8, wherein the second sun gear is mounted on the center shaft, the second carrier gear is connected to the drive hub, the third sun gear is connected to the turn clutch hub, the third ring gear is connected to the second rotatable housing, and the second ring gear and the third carrier gear are coupled to each other.

10. A geared steering device in accordance with claim 8, wherein the third carrier gear is coupled to the second rotatable housing, and the second ring gear and the third ring gear are coupled to each other.

11. A geared steering device in accordance with claim 8, wherein the second ring gear is coupled to the center shaft, and the second sun gear and the third carrier gear are coupled to each other.

12. A geared steering device in accordance with claim 8, wherein the central shaft is coaxial with the first one of the output shafts and with the first planet gear train.

13. A geared steering device in accordance with claim 1, further comprising:

a steering lever adapted to indicate a steering direction and provide a desired turning radius signal;

a power input shaft connected to the power input drive element to provide driving power to the power input drive element from the prime mover;

a first sensor for providing a first signal representative of a rotation rate of the power input shaft;

a second sensor for providing a second signal representative of a rotation rate of the turn clutch hub;

a controller which calculates a designated steering ratio from the desired turning radius signal, calculates an actual steering ratio from said first and second signals, compares the thus calculated actual steering ratio with the thus calculated designated steering ratio, and outputs signals for selectively controlling the first and second direct-coupled clutches, the turn clutch, the first and second steering brakes, and the discharge control device of the variable capacity hydraulic pump so as to cause the actual steering ratio to approximate the designated steering ratio.

14. A geared steering device in accordance with claim 13, wherein the controller establishes a steering ratio deviation signal responsive to the difference between the calculated actual steering ratio and the calculated designated steering ratio, and establishes, responsive to the steering ratio deviation signal, a hydraulic pump control signal which causes the steering ratio deviation signal to approach and closely approximate zero, and outputs the hydraulic pump control signal to the discharge control device of the variable capacity hydraulic pump when the desired turning radius signal indicates a turning radius larger than specified by a geared steering ratio of the geared steering device.

15. A geared steering device in accordance with claim 13, further comprising a transmission, a torque converter connected between the prime mover and the power input drive element, with the power input shaft being the output shaft of the torque converter and the input shaft of the transmission, a changeover detector associated with the transmission to provide the controller with a speed step signal representative of the speed step of the transmission, and wherein the controller calculates a transmission output shaft rotation rate in response to the first signal and the speed step signal.

16. A geared steering device in accordance with claim 13, wherein each of the first and second direct-coupled clutches, the turn clutch, and the first and second steering brakes is operated hydraulically via the passage of hydraulic fluid through a respective solenoid valve, and wherein the controller outputs signals to respective solenoid valves to selectively control the direct-coupled clutches, the turn clutch, and the steering brakes.

17. A geared steering device in accordance with claim 16, further comprising a transmission, a torque converter connected between the prime mover and the power input drive element, with the power input shaft being the output shaft of the torque converter and the input shaft of the transmission, a changeover detector associated with the transmission to provide the controller with a speed step signal representative of the speed step of the transmission, and wherein the controller calculates a transmission output shaft rotation rate in response to the first signal and the speed step signal.

18. A geared steering device in accordance with claim 17, wherein the controller calculates the actual steering ratio from the second signal and the calculated transmission output shaft rotation rate.

19. A geared steering device in accordance with claim 13, wherein the controller includes a steering direction discriminator and an opposite steering direction direct-coupled clutch ON generator, with the designated steering ratio being inputted from the steering lever to the steering direction discriminator, and the steering direction discriminator outputting a steering direction signal to the opposite steering direction direct-coupled clutch ON generator, and the opposite steering direction direct-coupled clutch ON generator providing an engagement signal to the solenoid of the solenoid valve for the direct-coupled clutch which is on the side opposite the steering direction.

* * * * *